United States Patent [19]

Taniguchi et al.

[11] Patent Number: 4,879,085
[45] Date of Patent: Nov. 7, 1989

[54] METHOD OF MANUFACTURING POLYACETAL RESIN FILM

[75] Inventors: Kotaro Taniguchi, Nagaokakyo; Toshio Konishi, Sakai; Takehiko Shimura, Nara; Shigekazu Tanimoto; Shigeru Nedzu, both of Fuji, all of Japan

[73] Assignee: Polyplastics Co., Ltd., Osaka, Japan

[21] Appl. No.: 176,820

[22] Filed: Apr. 1, 1988

[30] Foreign Application Priority Data

Apr. 1, 1987 [JP] Japan .................................. 62-80096
Jun. 22, 1987 [JP] Japan ................................ 62-155057

[51] Int. Cl.$^4$ ..................... B29C 49/04; B29C 49/08; C08G 2/00; C08G 6/00
[52] U.S. Cl. .................. 264/564; 264/209.1; 264/331.22; 528/230; 528/270
[58] Field of Search ................ 264/209.1, 331.22, 564, 264/565; 528/230, 270

[56] References Cited

U.S. PATENT DOCUMENTS

| | | | |
|---|---|---|---|
| 2,904,844 | 9/1959 | Smithies | 264/211 X |
| 3,933,965 | 1/1976 | Gallone et al. | 264/209.1 X |
| 4,654,179 | 3/1987 | Cartier et al. | 264/331.22 X |
| 4,668,761 | 5/1987 | Aoshima et al. | 528/230 |

Primary Examiner—Jeffery Thurlow
Assistant Examiner—Leo B. Tentoni
Attorney, Agent, or Firm—Nixon & Vanderhye

[57] ABSTRACT

A polyacetal resin is manufactured by an improvement whereby a polyacetal resin having a melt index (MI) of 0.3~5.0 is formed into film by an inflation process within an extrusion resin temperature range according to the following equation:

$$\text{melting point (°C.)} < \text{extrusion resin temperature (°C.)} \leq \text{melting point} + 100 - 8 \cdot \text{melt index (°C.).}$$

5 Claims, 2 Drawing Sheets

METHOD OF MANUFACTURING POLYACETAL RESIN FILM

FIELD OF INVENTION

The present invention relates to a method for making film from a polyacetal resin. In particular, the invention provides a resulting film exhibiting little tear strength both laterally and vertically, and thus is relatively easy to tear along a straight line.

BACKGROUND OF THE INVENTION

Polyacetal resins, or polymeric compounds having recurring —$CH_2$—O— units, are well known and widely used as typical engineering plastics.

However, most polyacetal resins are used exclusively for injection moldings and are rarely used for extrusion moldings and films. The reason for such usage is that film forming of polyacetal resins is extremely difficult. Generally, two types of film producing processes are known, namely, a T-die process and an inflation process. The T-die process generally comprises broadening a stream of molten plastic introduced from one spot to the desired film width so as to change the stream into one having as much thickness uniformity as possible, extruding it through a slip-shaped nozzle in the form of a membrane, then cooling it into a film. The inflation process is often employed in forming a film of polyethylene. It comprises extruding molten plastic through an annular extrusion nozzle in a tubular pattern, blowing air or like fluid into the tube, thereby inflating the tube to form a tubular film. The T-die process and the inflation process have their respective advantages and disadvantages. As compared with the T-die process, the inflation process generally results in greater film productivity and is more economical. The inflation process is also suitable for thin-gage film forming, but its adaptability varies depending upon the particular resin mterial being processed As such, it cannot be said that the inflation process is applicable to all types of resins. With polyacetal resins, various technical problems exist with respect to manufacturing films there of by the inflation process. Therefore, polyacetal resin film manufacturing has not been commercialized.

By means of the present invention, however, it is now possible to manufacture polyacetal resin films by the inflation process. As a result, it possible to apply the inflation process to polyacetal resin film manufacturing by selecting a certain polyacetal resin and certain temperature conditions, as will be defined in greater detail below.

SUMMARY OF THE INVENTION

The present invention provides a method of manufacturing a polyacetal resin film to wherein a polyacetal resin having a melt index of 0.3~5.0 is formed into film by an inflation process within an extrusion resin temperature range according to the following equation:

melting point (°C.) < extrusion resin temperature (°C.) ≦ melting point + 100 − 8 · melt index (°C.).

BRIEF DESCRIPTION OF THE DRAWINGS

Reference will be made to the accompanying drawings wherein.

DETAILED DESCRIPTION OF THE INVENTION

The present invention is based on the discovery that, only with a polyacetal resin having a melt index of 0.3~5.0, is it possible to form the polyacetal resin into film using inflation molding using an extrusion resin temperature within a temperature range according to the foregoing equation.

The melt index used in the invention (hereinafter called MI) refers to a value determined according to ASTM D-1238. The melting point refers to the temperature of an endothermic peak determined by differential thermal analysis.

Polyacetal resins usefully employed in the present invention may be those commercially available polyacetal resins which have a relatively low MI and a large average molecular weight. More particularly, those having a MI range of 0.5~3.0 are preferred, whether homopolymer or copolymer. Those having a MI of less than 0.3 are difficult to manufacture as such, and those having a MI of more than 5.0 are undesirable because film making is difficult due to their being subject to drawdown during an inflation molding operation.

Particularly preferred are polyacetal resins having a crosslinked or branched molecular structure. Such polyacetal resins can be obtained by causing a compound having more than one functional group capable of producing a branched or crosslinked structure to react with a polymerized linear polyacetal polymer. Such resins can also be obtained by incorporating a monomer having more than one functional group capable of producing a branching or crosslinking reaction into one of the monomer components so as to effect copolymerization. One example of such a resin is an acetal copolymer resin in which trioxane and a monomer having a glycidyl group are polymerized as one component. Of course, a multi-copolymer incorporating co-monomers, such as cyclic ether, which are conventionally used, as required also be employed.

In the process of inflation molding, it is important that when the polyacetal resin having the specific MI value as mentioned above is melt extruded from an annular nozzle by the inflation technique, the resin temperature should be maintained within a range of temperatures according to the following equation:

melting point (°C.) < extrusion resin temperature (°C.) ≦ melting point + 100 − 8 · $MI$ (°C.).

Preferably, the resin temperature should be within the range according to the following equation:

melting point 10 (°C.) ≦ extrusion resin temperature (°C.) ≦ melting point + 100 − 8 · $MI$ (°C.).

Figure 1:
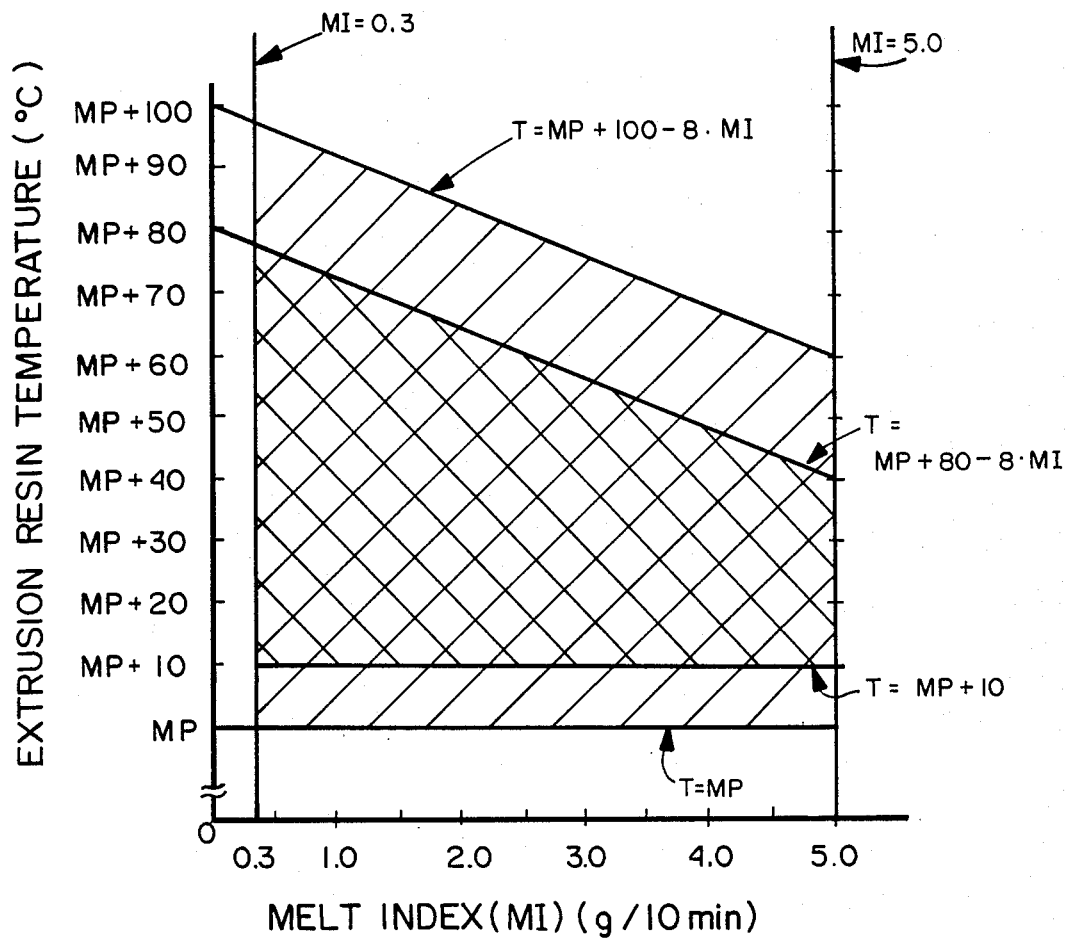
FIG. 1 is a graph showing the range of resin temperatures to be employed in the process according to the present invention.

These resin temperature ranges applicable to inflation molding are shown in FIG. 1. If the resin temperature is too high, the melt viscosity becomes lower, and thus film forming is rendered difficult due to drawdown effects. If the temperature is too high, the melt viscosity becomes higher, a large pressure loss being caused in the die, resulting in increased power requirements for extruder operation and, accordingly, lower productivity. Further, higher resin temperatures accelerate film thickness irregularity.

Film forming of polyacetal resin by the inflation process in accordance with the invention is rendered practicable by maintaining the foregoing essential requirements. For other conditions, general conditions for the inflation technique are applicable. That is, by employing a crosshead die a tubular molten polyacetal resin is extruded upward or downward, and the end of the tubular extruded resin is pinched between pinch rolls. Air is blown into the extruded tube so that the tube is inflated to the desired size, and the film is continuously being taken up. Meanwhile, the die is rotated or reversed, whereby any thickness irregularity can be prevented. The tubular film may be cut at both ends, one of the ends being sealed so that the film is formed into a bag. Or, it may be suitable drawn as a sheet of film and heat set or otherwise treated to provide a film taking advantage of the characteristic features of polyacetal resin and varied property values adapted for various end uses. The films produced according to the invention may be adjusted in thickness according to the normal standards of the inflation technique. Such adjustment can be made generally within the range of 0.005~0.1 mm.

Furthermore, it has been found that a polyacetal resin film prepared by the inflation process according to the present invention has excellent characterastics, namely, the lengthwise tear strength and transverse tear strength are both small, and the linearity of tear is excellent.

Generally, a plastics film manufactured by the extrusion molding process has a molecular orientation in the extrusion direction (hereinafter referred to as lengthwise direction) and therefore the tear in the lengthwise direction easily occurs. However, the tear in the transverse direction is more difficult. Still further, a film extruded in the extrusion direction has a larger lengthwise tensile strength, and the inclination of of the film to tear in the lengthwise direction is also strengthened.

However, a film which can be easily torn in both of lengthwise and transverse directions has not yet been proposed.

It has therefore been found that a film which has little tear strength in both of lengthwise and transverse directions can be manufactured by making polyacetal resin film according to the inflation process under the aforementioned conditions. Especially, polyacetal resin film having little tear strength in the transverse direction and excellent linearity of tear can be manufactured by the inflation method under the conditions whereby the blow ratio ($R_b$) is between 1.2 to 6.0, the draw ratio ($R_d$) is between 1.0 to 12.0, and whereby the ratio of $R_b/R_d$ is satisfied by the following relationship:

$0.1 \leq R_b/R_d \leq 6.0$.

Figure 2:
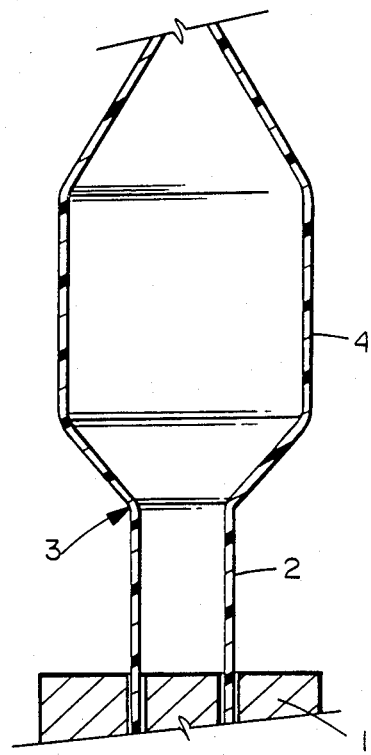
FIG. 2 is a schematic representation of an inflation film-forming process according to the present invention.

In the present invention, the blow rate and the draw rate is defined as follows;

In FIG. 2, a melted resin extruded from a die 1 is transmitted while maintaining about the same diameter to form a tube material 2 and thereafter expanded from a starting point of deformation 3. When the diameter of the tube material at the starting point of deformation 3 is $D_N$, the velocity thereof is $V_E$, the diameter of the bubble 4 after deformation is $D_E$ and the velocity thereof is $V_E$;

$R_b = D_E(\text{mm})/D_N$ $R_d = V_E(\text{m/min})/D_E(\text{m/min})$.

According to the present invention, a polyacetal resin film, which has a tear strength of 50 kg/cm or less in the extrusion direction and also in the right angle direction, tear propagation strength of 10 kg/cm or less and excellent linearity of tear, can be obtained. However, when the value of the ratio of $R_b/R_d$ is less than the above range, the tear strength in the transverse direction (right angle direction) becomes larger than the tear strength in the lengthwise direction (extrusion direction) and the linearity of tear becomes smaller. On the other hand, the ratio of $R_b/R_d$ is greater than the above range, the tear strength in the transverse direction becomes smaller than the tear strength in the lengthwise direction and the linearity of tear becomes larger.

The film prepared by the inflation process according to the present invention has tear strengths of 50 kg/cm or less in the extrusion direction and also in the right angle direction, ter propagation strength of 10 kg/cm or less and excellent linearity of tear. Therefore, the film of this invention can be torn without nap and can be used satisfactorily as an unsealing member and the like.

The polyacetal resin used in the practice of the invention may, according to the performance requirements for the film, incorporate known substances which may be added to conventional thermoplastic and thermosetting resins, including stabilizers, such as plasticizers, antioxidants, and UV light absorbing agents; antistatic agents; surface active agents; colorants, such as dyes and pigments; lubricants for fluidity improvement; and crystalization accelerators (nucleating agent). Further, according to the purpose for which the film is used, a small amount of some other thermoplastic resin or inorganic filler may be supplementarily added.

As above described, according to the method of the invention, it is possible to manufacture polyacetal resin films by the inflation technique, and as compared with the conventional T-die process, the invention assures improved productivity and economy. The invention permits easy manufacture of a comparatively thin film through the application of known techniques. The resulting film has excellent properties characteristic of polyacetal resins, e.g., excellent mechanical, physical, chemical, and thermal properties, and further it has such special property as oxygen non-permeability. Therefore, the film may be used alone as such or in lamination with some other film or metallic foil, for packaging purposes or various other end uses taking advantage of its characteristic features. The above shown application of the film obtained by the invention is easy to tear straight because it has a small tear strength at both lateral and vertical directions and an excellent lenearity of tearing.

EXAMPLES

The present invention will be described further in the following nonlimiting Examples.

EXAMPLE 1

An acetal copolymer resin P (having a MI of 2.5 and a melting point of 165° C.) was used in which the weight ratio between its oxymethylene portion and its oxyethylene portion was 98:2. By employing a 40 mm extruder and a die with a die diameter of 50 mm and die lip gap of 3 mm, a tubular film was extruded at a resin temperature of 200° C., a drawing ratio of 8.0 and a blow ratio of 2.4. The film was taken off at a take-off rate of 21 m/min under air cooling. Thus, a film having a thickness of 25μ was obtained.

The properties of the 25μ thick film obtained were as shown in Table 1 below.

The properties of the resin and of the film were determined in the following way:

MI: measured in accordance with ASTM D 1238 and under the conditions of load 2160 g at 190° C. and cylinder 10 mm×die diameter of 1 m.

Melting point: measured by DSC (heating up rate 5° C./min) at an endothermic peak position.

Tensile strength/elongation: measured according to ASTM D 882.

Oxygen permeability: measured according to ASTM D 1434.

Tear strength; it was measured according as JIS Z Elmendorf tea testing, however the initial cut was not made on the specimen.

Tear propagation strength; it was measured according as JIS Z Elmendorf tea testing Linearity of tear; one side of specimen of 300 mm was torn in the right angle direction with hands and the linearity of torn line was measured. The deviation of the torn line from the right angle direction was judged as follows;
below 10 mm: ○
10~50 mm: Δ
above 50 mm: ×

EXAMPLE 2

An acetal graft copolymer resin Q (with a MI of 0.8 and a melting point of 166° C.) in which the weight ratio between its oxymethylene portion, its oxyethylene portion, and hexaoxymethylene diol glycidyl was 97.2:2:0.8 was used. By employing a 50 mm extruder and a die with a die diameter of 120 mm and a die lip gap of 1 mm, a tubular film was extruded at a resin temperature of 210° C., a drawing ratio of 2.0 and blow ratios of 1.2 to 3.6. It was taken out at a take-off rate of 25 to 40 m/min under air cooling. Thus, films having a thickness of 8~50μ were obtained.

The properties of the films obtained, 25μ thick and 50μ thick, were as shown in Table 2 below.

TABLE 1

|  | Extrusion direction | Rectangular direction |
|---|---|---|
| Tensile strength (kg/cm²) | 567 | 683 |
| Tensile elongation (%) | 76 | 3 |
| Oxygen permeability (cc/m² · day · 1 atm) | 342 | |
| Tear Strength (kg/cm) | 6.0 | 20.5 |
| Tear Propagation Strength (kg/cm) | 2.2 | 5.7 |
| Linearity of Tear | 0 | 0 |

TABLE 2

|  | 25μ thick | | 50μ thick | |
|---|---|---|---|---|
|  | Extrusion direction | Rectangular direction | Extrusion direction | Rectangular direction |
| Tensile strength (kg/cm²) | 553 | 680 | 600 | 700 |
| Tensile elongation (%) | 103 | 3.5 | 107 | 3.7 |
| Oxygen permeability (cc/m² · day · 1 atm) | 364 | | 181 | |

COMPARATIVE EXAMPLE 1

An acetal copolymer resin (with a MI of 9.0 and a melting point of 165° C.) in which the weight ratio between its oxymethylene and oxyethylene portions was 98:2 was used. Inflation molding was attempted at varied extrusion resin temperatures in same way as in Example 1, but no stable film forming could be attained.

EXAMPLES 3 AND 4; COMPARATIVE EXAMPLES 2 AND 3

Film forming attempts were made using same polyacetal copolymers 9 and Q as used in Examples 1 and 2 and at varied extrusion resin temperatures. Results are as shown in Table 3 and 4.

TABLE 3

|  |  | Example 3 (copolymer P) | | Comp. Exmp 2 (copolymer P) | |
|---|---|---|---|---|---|
| Resin temp. (°C.) |  | 180 | 220 | 240 | 260 |
| Film forming condition |  | stable | stable | somewhat unstable | no good (drawdown) |
| Tensile strength (kg/cm²) | extrusion direction | 561 | 533 | — | — |
|  | rectangular direction | 672 | 633 | — | — |
| Tensile elongation (%) | extrusion direction | 63 | 72 | — | — |
|  | rectangular direction | 3.2 | 3.2 | — | — |

TABLE 4

|  |  | Example 4 (copolymer Q) | | | Comp. Exmp 3 (copolymer Q) |
|---|---|---|---|---|---|
| Resin temp. (°C.) |  | 180 | 220 | 240 | 260 |
| Film forming conditon |  | stable | stable | stable | unstable |
| Tensile strength (kg/cm²) | extrusion direction | 540 | 622 | 533 | — |
|  | rectangular direction | 667 | 720 | 634 | — |
| Tensile elongation (%) | extrusion direction | 101 | 108 | 85 | — |
|  | rectangular direction | 3.5 | 3.7 | 3.2 | — |

EXAMPLE 5, COMPARTIVE EXAMPLE 4

A film of 25μ in thickness was formed under the similar conditions as the example 1, however a blow rate of 3.6 and a draw rate of 2.0 were set and the properties thereof were judged similarly. The result thereof is described in the table 5. As a compartive example, low density polyethylene film (MI 0.2) of 25μ in thickness was formed under the same condi-tion and the result thereof is also described in the table.

TABLE 5

|  | extrusion direction | right angle direction |
|---|---|---|
| Example 5 |  |  |
| tensile strength (kg/cm) | 668 | 683 |
| tear propagation strength (kg/cm) | 4.2 | 4.0 |
| linearity of tear | ○ | ○ |
| Example 4 |  |  |
| tensile strength (kg/cm) | 220 | 210 |
| tear propagation strength (kg/cm) | 26.3 | 23.7 |
| linearity of tear | X | X |

What is claimed is:

1. A method of manufacturing a polyacetal resin film comprising forming a polyacetal resin having a melt index of between 0.3 to 5.0 into a film by an inflation process within an extrusion resin temperature range according to the following equation:

melting point (°C.) < extrusion resin temperature (°C.) ≦ melting point + 100 − 8 · melt index (°C.).

2. A method as in claim 1, wherein the melt index of the polyacetal resin is between 0.5 to 3.0.

3. A method as in claim 1, wherein the extrusion resin temperature is within a range according to the following equation:

melting point + 10 (°C.) ≦ extrusion resin temperature (°C.) ≦ melting point + 80 − 8 · melt index (°C.).

4. A method as in any one of claims 1-3, wherein the polyacetal resin has a crosslinked or branched molecular structure.

5. A method as in claim 1, wherein the inflation process is practiced by providing a blow ratio $R_b$ within the range of between 1.2 to 6.0, a draw ratio $R_d$ within the range of between 1 to 12, and a ratio of $R_b$ to $R_d$ which is greater than or equal to 0.1 but less than or equal to 6.0.

* * * * *

UNITED STATES PATENT AND TRADEMARK OFFICE
CERTIFICATE OF CORRECTION

PATENT NO. : 4,879,085

DATED : November 7, 1989

INVENTOR(S) : Taniguchi et al

It is certified that error appears in the above-identified patent and that said Letters Patent is hereby corrected as shown below:

First Page, under ABSTRACT, line 1, after "resin" insert --film--.

Column 1, line 43, change "there of" to --thereof--;
         line 48, after "it" insert --is--;
         line 56, after "film" delete "to".

Column 2, line 46, after "used" delete the comma (,), and after "required" insert --may--.

Column 3, line 21, after "may be" delete "suitable";
         line 39, after "therefore" delete "the" and insert --a--;
         line 40, after "However," delete "the" and insert --a--.

Column 4, line 37, change "agent" to --agents--.

Signed and Sealed this

Twenty-fifth Day of December, 1990

Attest:

HARRY F. MANBECK, JR.

*Attesting Officer*      *Commissioner of Patents and Trademarks*